July 22, 1958 P. J. NOIZEUX 2,844,712

AUTOMATIC POWER REDUCER FOR TRANSMITTERS

Filed Jan. 14, 1954

INVENTOR.
Pedro J. Noizeux

BY Charles H. Brown

ATTORNEY

United States Patent Office 2,844,712

Patented July 22, 1958

2,844,712

AUTOMATIC POWER REDUCER FOR TRANSMITTERS

Pedro J. Noizeux, Buenos Aires, Argentina, assignor to Radio Corporation of America, a corporation of Delaware Application January 14, 1954, Serial No. 404,048

The terminal fifteen years of the term of the patent to be granted has been disclaimed 2 Claims. (Cl. 250—17)

This invention relates to automatic power reducers for radio transmitters, and more particularly to such transmitters which work at full power indiscriminately during the transmission of messages or during idle periods.

In many types of communication systems, the radio transmitter delivers full power output all of the time, even though the circuit is idle a relatively large percentage of the time. For instance, when messages are transmitted using frequency shift keying where the carrier frequency is changed in response to the keying signal, the power output is constant during message traffic periods or when no transmission of message information is being made. For purposes of maintaining contact in radio communications circuits, it is generally desirable to keep the transmitters operating during the idle period. With certain types of receivers, such as those having automatic frequency control, it is also desirable to maintain a carrier output of the remote transmitter to which the receiver is tuned so that the receiver continues to hold itself in tune.

If full carrier is radiated all the time during idle periods, the power used and the tube depreciation involve a considerable financial burden. However, it is not necessary to keep the carrier at full amplitude during idle periods in order to maintain automatic frequency control at the receiver, or to maintain contact over the radio circuit.

This invention pertains to a system of reducing the transmitter output power during idle periods. This has several advantages: a considerable saving in the power consumed by the transmitter may be realized, and the load on the output tubes is reduced, allowing the tubes to be operated with less power dissipation, and giving these most expensive tubes in the transmitter a longer life.

An object of the invention is to provide an improved automatic power reducer designed to be operative in the absence of keying signals, for radio transmitters of the type in which the radio frequency output power is normally constant during both message and idle periods.

A further object is to provide an automatic power regulating system for radio telegraph transmitters, which includes means for increasing the power output of the radio telegraphy transmitter upon the receipt of keying or modulating signals.

In accordance with the invention, these and other objects are attained by an automatic power reducer which controls the operating potential supplied to the power output tubes. During idle periods, there is, in the absence of keying signals in the radio transmitter, an auxiliary circuit which reduces the operating potential supplied to the output tubes. During these reduced power periods, the transmitter power amplifier or output stage operates with less plate current, lower plate dissipation, and with reduced power consumption. Upon receipt of a keying signal or the beginning character of a message, the operating voltage of the power output stage is restored to maximum, to bring the transmitter to full power at once. A time delaying circuit is included which maintains the transmitter at full power output for an interval after the last character is transmitted in a message.

A more detailed description follows, in conjunction with a drawing, wherein.

Figure 1:
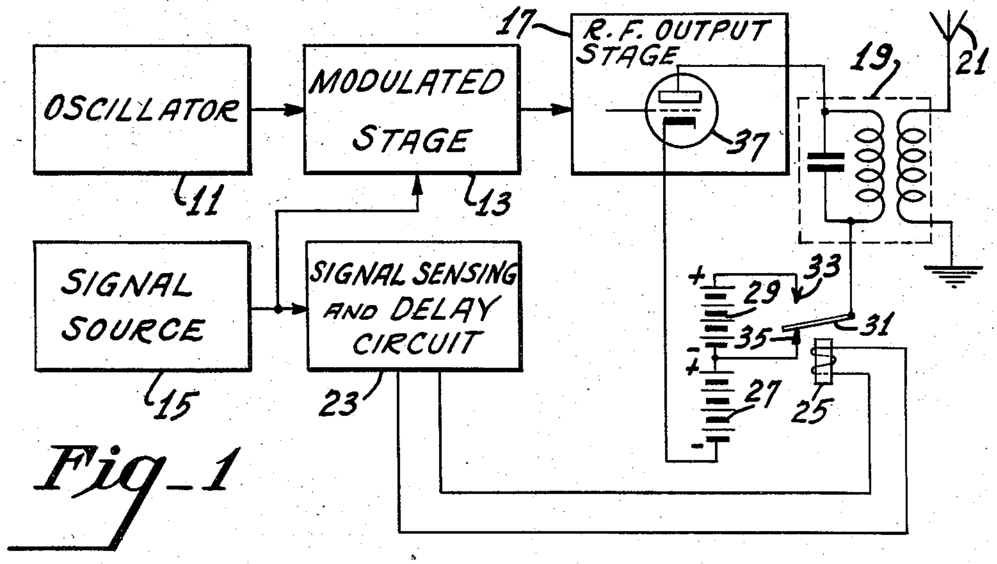
Figure 1 illustrates schematically the system of the invention.

Referring now to Figure 1, there is shown schematically, in block diagram form, a radio transmitter which includes the system of the invention. Radio frequency energy is generated by an oscillator 11 and may be amplified by radio frequency amplifiers in the conventional manner and fed to a modulated stage 13. A source of signal energy 15 such as, for example, a source of direct current keying signals like those delivered from a telegraph circuit, is also fed to the modulated stage, or alternatively, a conventional audio signal may be fed to the modulated stage 13. The modulated radio frequency energy is then amplified in a radio frequency output stage or power amplifier 17. From the radio frequency output stage 17, the useful radio frequency energy is coupled by means of a conventional coupling circuit 19 to the radio frequency load device, such as a transmission line or an antenna 21.

The signal from the signal source 15 is also applied to a signal sensing circuit 23 which, in the case of a mark-space telegraph keying signal, is a simple relay circuit having a quick closing and time delayed release characteristic. If the radio transmitter is to be used with audio signals such as voice or music, the signal sensing circuit 23 contains a rectifier and a time constant circuit having a quick charge and slow decay characteristic. The signal sensing and delay circuit 23 directly controls a relay 25. The power supply for the radio frequency output stage 17 is divided into two portions connected in series. These are indicated schematically in Figure 1 by the batteries 27 and 29, but it should be understood that direct current generators or other sources of direct operating potential may be substituted therefor. The relay 25 has an armature 31 which cooperates with either front or back contacts 33, 35 depending upon the energization from the signal sensing circuit 23. The armature 31 of the relay 25 is connected to the output electrode of a vacuum tube 37 in the radio frequency output stage, while the most negative end of the operating power supply 27, 29 is connected to the cathode of the vacuum tube 37.

The operation of the circuit is as follows: in the absence of signals from the signal source 15, the signal sensing and delay circuit 23 causes the armature of the relay 25 to be operated to the lower contact 35 which places only one portion 27 of the entire power supply in series with the vacuum tube 37. The other portion 29 of the power supply is out of the circuit and consequently does not furnish current during idle periods of the transmitter.

Upon the commencement of signals from the signal source 15, the signal sensing circuit causes the relay 25 to operate so that the armature 31 contacts the upper contact 33. This places the entire power supply 27 and 29 in series, increasing the operating potential supplied to the vacuum tube 37 and the radio frequency output stage 17, and increasing the power output of the radio frequency output stage 37. This condition continues during the transmission of a message, and when signals cease from the signal source 15, the delay circuit portion of the signal sensing and delay circuit 23 holds the relay 25 in the condition with the armature 31 operated to the contact 33 for a predetermined period of time. This action is done in order to prevent the radio frequency output being reduced during intersyllabic pauses in voice transmission or pauses between messages or words in code transmission. A representative delay period, during which the signal delay circuit 23 will hold the armature 31 operated to the high voltage contact 33 after the cessation of signals from the signal source 15, is forty to forty-five seconds.

At the expiration of the delay time, the signal sensing and delay circuit allows the armature 31 of the relay 25 to operate to the lower voltage contact 35 of the power supply. This reduces the operating voltage of the radio frequency output voltage 17 and the power output is thereby reduced to a level which is just sufficient to maintain contact with the distant station. For example, in radio telegraph communication systems, the total radio frequency power may be reduced about 10 db. The ratio of high to low voltage energization of the radio frequency output stage 17 may be adjusted according to different propagation conditions by varying the relative voltage of one portion 27 relative to the other portion 29 of the power supply.

Figure 2:
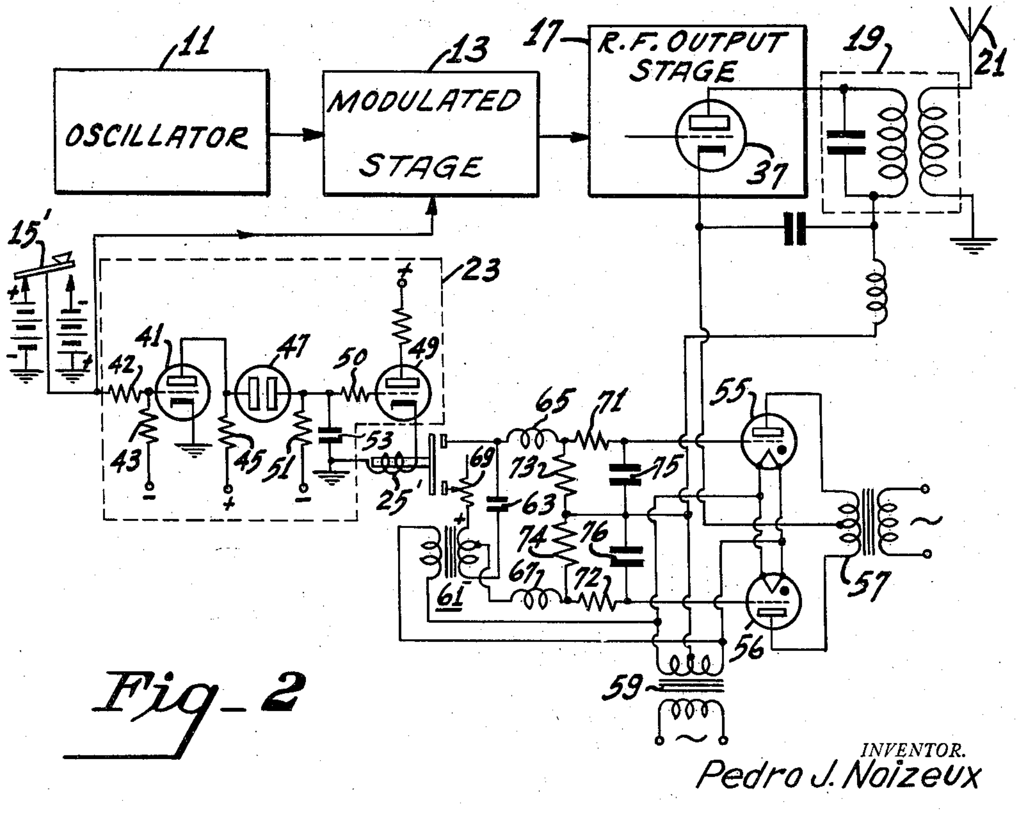
Figure 2 is a circuit diagram, shown partially in schematic form, illustrating the application of the invention to a frequency shift keyed transmitter.

Figure 2 shows a practical embodiment of the system of the invention in a radio transmitter, part of which is shown in block diagram form. The oscillator 11, the modulated stage 13, the radio frequency output stage 17, and the output coupling circuit 19 are of conventional form and like the similarly numbered blocks of Figure 1.

For purposes of illustration, the operation of the invention will be explained with reference to a frequency shift radio telegraphy system. The source of signals which is used to modulate the radio transmitter is indicated as a key 15′ which produces one polarity (negative) for mark signals and the opposite polarity (positive) for space signals. The key 15′ is representative of automatic on-off or mark-space keying devices, such as Teletype and other automatic keyers, as well as of hand keys. The signal from the keying device 15′ is fed to the modulated stage 13 to control the information placed on the radio frequency signal in the transmitter, as for example by shifting the frequency or phase of the carrier energy applied to the radio frequency output stage. The mark-space telegraph signal from the output of the keying device 15′ will be polar in the arrangement of Figure 2. This signal is also applied to the signal sensing circuit 23. The signal sensing circuit 23 shown as an example has a vacuum tube 41 whose grid electrode is directly coupled by a resistor 42 to the source of signals 15′. The proper negative operating bias for the grid of the vacuum tube 41 is supplied through a grid resistor 43, and the output of the vacuum tube is taken across a plate load resistor 45. A neon bulb 47 or other glow discharge device is used to couple the output of the first vacuum tube 41 to the input of a second vacuum tube 49 through a resistor 50. The proper operating grid voltage for the second vacuum tube 49 is supplied through a resistor 51. A capacitor 53 is connected in shunt to the grid resistor 51 and the negative power supply. The resistor 51 and the capacitor 53 form a time constant circuit whose purpose and operation will be explained in more detail below. The operating winding of a relay 25′ is connected in series in the anode-cathode current path of the vaccum tube 49.

The operation of the signal sensing and delay circuit 23 of Figure 2 is as follows: On mark, that is with the key 15′ impressing a negative voltage on the modulated stage and the signal sensing circuit 23, a negative voltage is impressed on the grid of the vacuum tube 41 sufficient to cut off the flow of plate current therethrough. The end of the load resistor 45 which is connected to the plate of the vacuum tube 41 is highly positive and the neon tube 47 conducts through the grid resistor 51 and the plate load resistor 45. This charges the capacitor 53 so that the grid of the vacuum tube 49 is positive with respect to the cathode and a large amount of current flows through the anode-cathode path, energizing the winding of the relay 25′. Relay 25′ is illustrated in its unenergized position.

Upon the cessation of mark signal from the key 15′, the tube 41 conducts. When the tube 41 begins to conduct, the voltage at the upper end of the plate load resistor 45 falls, dropping the voltage across the neon lamp 47 below the extinguishing point and the neon lamp 47 ceases to conduct. The charge on the capacitor 53 now leaks off through the resistor 51 and the negative portion of the power supply, making the grid of the vacuum tube 49 less positive and eventually negative. By the choice of the proper values of the resistor 51 and the capacitor 53, the time constant of the circuit is made long enough to provide for the proper amount of delay for the type of operation desired. As mentioned above, the hold-over period during which the vacuum tube 49 will be conductive and during which the relay 25′ remains operated may be from 40 to 45 seconds in the case of telegraph keying signals. When the charge on the capacitor 53 has leaked off sufficiently, the tube 49 ceases to conduct, so that the current through the anode-cathode path is insufficient to maintain the relay 25′ energized. At this point, the armature of the relay 25′ reverses and falls to the nonoperated position.

Upon the institution of new signals, the vacuum tube 41 cuts off immediately and the neon lamp 47 is immediately lighted, charging the capacitor 53 positively on the first mark signal of the succeeding message. The tube 49 therefore conducts and closes the relay 25′ in the spacing of one mark period. This fast operating action and slow release operation is aided by the action of the neon lamp 47, whose immediate conduction characteristics allow the capacitor 53 to be charged at once.

The relay 25′ controls the voltage output of the power supply circuit for the radio frequency output stage 17. The power supply for the radio frequency output stage includes two grid controlled gas discharge devices or thyratrons 55 and 56. The output direct current voltage from the thyratron power supply depends upon the percentage of the time during the cycle that the thyratrons 55, 56 are conducting. The grids of the thyratrons are energized with an alternating voltage whose phase relative to the alternating voltage applied to the anodes or plates of the thyratrons 55, 56 can be switched between two preestablished conditions by means of the relay 25′. A source of alternating voltage is applied to a power supply transformer 57 which has a center tapped secondary winding. The ends of the secondary winding are connected to the plates of the two thyratrons 55 and 56. The center tap on the secondary constitutes the negative terminal of the power supply.

Another transformer 59 is used to energize the filament circuit of the grid controlled thyratrons, and if desired a common winding on this transformer may be used directly, through the phase shifting network to be described, to excite the grids of the two thyratrons 55 and 56. For purposes of circuit isolation, it is preferred to excite a third transformer 61 from the secondary winding of the filament transformer 59. The grid excitation transformer 61 has a tapped secondary winding.

The three terminals of the tapped secondary winding of the grid excitation transformer 61 are connected in a phase adjusting network whose output may be switched between two different phase conditions relative to the phase of the alternating voltage applied to the plates of the two thyratrons 55, 56. The network shown in Figure 2 consists of an LC arm, including a capacitor 63 and an inductance 65, connected to one end of the secondary winding of the transformer 61 and an inductance 67 connected to an intermediate point on the secondary winding. From the other end of the secondary winding of the grid excitation transformer 61, a variable resistor 69 is connected to one of the contacts cooperating with the armature of the relay 25'. The other contact of the relay 25' is connected to the junction between the capacitor 63 and the inductance 65.

The grid excitation voltage is coupled from the phase adjusting network 63, 65, 67 to the grids of the thyratrons 55, 56 by means of two series resistors 71, 72 and two grid resistors 73, 74, which return the grids to the center-tap of the transformer 59 to establish a reference potential. Grid-cathode bypass capacitors 75, 76 are connected directly in shunt betweeen grid and cathode of each of the thyratrons.

When the contacts of the relay 25' are open, the thyratrons 55 and 56 are conductive for only a small portion of each cycle of the alternating voltage applied, because of the phase of the excitation applied to the grids through the grid excitation transformer 61 and the phase adjusting network 63, 65, 67. When the relay 25' closes, the excitation applied to the grids is such that the grids go positive in each of the thyratrons 55, 56 at the same time that the anodes go positive, allowing maximum conduction and maximum current delivered to the load. The rectified voltage applied to the radio frequency output stage 17 is then at its highest value, and the transmitter operates at full power. When the current through the thyratrons 55 and 56 is reduced by the opening of the contacts of the relay 25', the current supplied by the power supply is lower, and the rectified voltage applied to the radio frequency output stage 17 is consequently lower.

The high and low voltage levels at which the power supply operates may be preset by varying the values of the inductances 65, 67 and the capacitor 63 for the lower output voltage, and by changing the value of the variable resistor 69 for the higher output voltage.

From the previously described operation of the signal sensing and delay circuit 23, it will be seen when signals are present the relay 25' is operated, causing the power supply to deliver its maximum operating voltage to the radio frequency output stage 17. When signal input ceases and the delay period has elapsed, the relay 25' opens, reducing the direct current operating voltage applied to the radio frequency output stage 17. The total power consumed from the alternating current mains which excite the power supply transformer 57 is then greatly reduced, thus effecting a considerable saving in operating costs. Furthermore, since the high power tubes in the radio frequency output stage 17 are operated at lower plate potential during idle periods, the life of these tubes is considerably increased and tube failures are less frequent.

What is claimed is:

1. An automatic power reducing system for radio transmitters having a source of input signals carrying telegraphic intelligence and also a radio frequency output stage providing an output radio frequency carrier which is modulated by said signals, said system comprising a signal sensing and delay circuit receptive of said signals, and a plate voltage supply for said output stage having two different predetermined levels of operating plate voltage each of which is greater than zero, said voltage supply being connected to supply operating plate voltage to said output stage; said circuit including means for developing a voltage whose value represents the presence and absence of telegraphic intelligence signals from said source, a relay controlled by said developed voltage for selectively applying the higher of said two levels of plate voltage to said output stage in the presence of intelligence signals and the lower of said two levels in the absence of intelligence signals, and a time constant network functioning to maintain said relay operated to continue the application of said higher of said two levels of plate voltage to said output stage for a period of time after the cessation of intelligence input signals.

2. In a radio transmitter, an automatic power reducer arrangement comprising a source of modulation frequency signals representing intelligence to be transmitted, a radio frequency output stage providing an output radio frequency carrier modulated by signals from said source, a sensing and delay circuit coupled to the output of said source, and a power supply for said output stage providing two different predetermined levels of operating plate voltage both greater than zero and both of the same relative polarity, said power supply being adapted to be connected to said output stage, both levels of operating plate voltage rendering said transmitter operative for the transmission of intelligence; said sensing circuit including means for deriving a voltage whose value represents the presence and absence of modulation frequency signals from said source, and relay means controlled by said derived voltage for selectively applying the higher of said two levels of plate voltage to said output stage in the presence of modulation frequency signals and for applying the lower of said two levels of plate voltage to said output stage in the absence of modulation frequency signals, whereby said transmitter transmits different finite output powers both greater than zero in response to the application of said two levels of plate voltage to said output stage.

References Cited in the file of this patent

UNITED STATES PATENTS

| | | |
|---|---|---|
| 1,804,526 | Coxhead | May 12, 1931 |
| 2,250,578 | Finch | July 29, 1941 |
| 2,259,290 | Bock | Oct. 14, 1941 |
| 2,444,426 | Busitnies | July 5, 1948 |
| 2,691,094 | Hilton | Oct. 5, 1954 |